July 20, 1943.    H. H. HALL    2,324,924
ELECTRODE HOLDER
Filed Feb. 13, 1943    2 Sheets-Sheet 1

HARVEY H. HALL,
INVENTOR.

BY Martin E. Anderson
Attorney

July 20, 1943.  H. H. HALL  2,324,924
ELECTRODE HOLDER
Filed Feb. 13, 1943  2 Sheets-Sheet 2
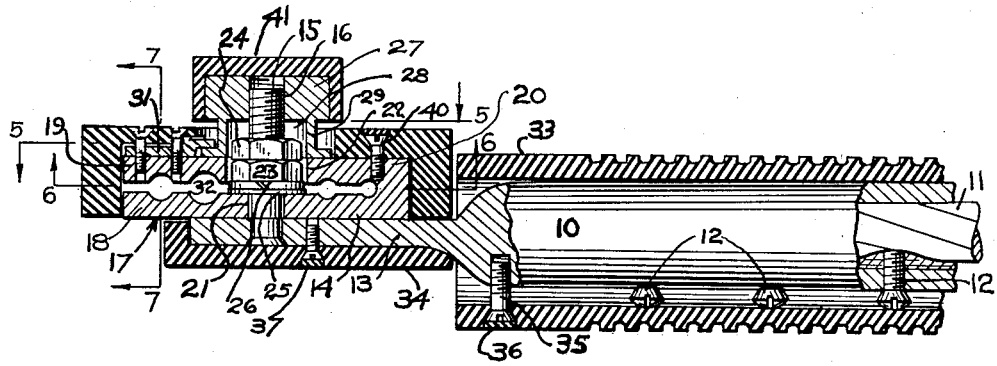
FIG. 4.
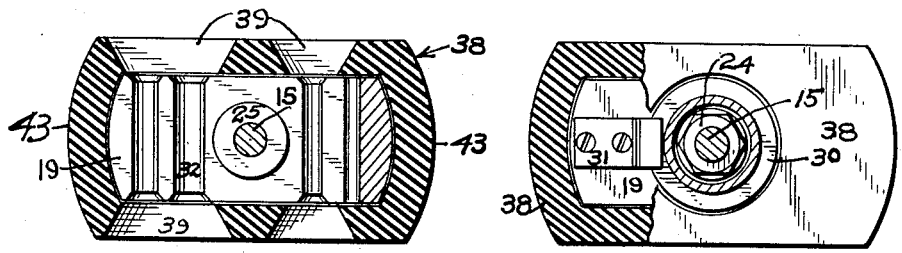
FIG. 6.  FIG. 5.
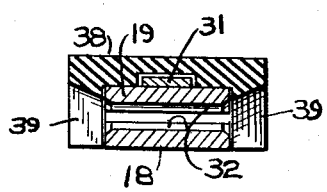  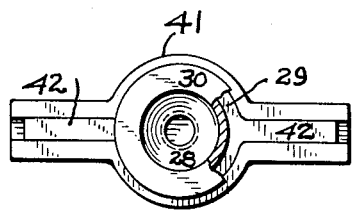
FIG. 7.  FIG. 8.
HARVEY H. HALL,
*INVENTOR.*
BY *Martin E. Anderson*
*Attorney*

Patented July 20, 1943

2,324,924

UNITED STATES PATENT OFFICE 2,324,924

ELECTRODE HOLDER

Harvey H. Hall, Denver, Colo.

Application February 13, 1943, Serial No. 475,841

7 Claims. (Cl. 219—8)

This invention relates to improvements in electrode holders of the type employed in connection with arc welding.

Arc welding is very extensively employed in industry wherever two pieces of metal are to be joined.

During the process of arc welding an electrode formed from iron or other metal to be employed in the welding operation is supported from a suitable holder and moved along the seam to be welded. The material to be welded and the electrode are connected to opposite poles of a suitable electric supply.

For the purpose of supporting such electrodes during the welding operation, many different holders have been invented, some of which are widely employed.

It is the object of this invenion to produce an electrode holder of an improved construction that shall have several advantages over those generally employed and which shall facilitate the operation of arc welding.

One object of this invention is to produce an electrode holder of such construction that it shall not require any special wrenches for its operation.

A further object is to produce an electrode holder of comparatively light weight and of such simple construction that it can be manufactured at a low price.

A further object is to produce an electrode holder that will not readily heat up during the operation.

A still further object is to produce an electrode holder in which the electrode can be adjusted about a pivot so as to bring it into the most desirable position for either sidewise or up and down motion, and which can also be adjusted to the most desirable angle for welding parts supported on a table or forming a horizontal surface.

Another object is to produce an electrode holder in which an increased contact area is provided between the cable and the handle so as to reduce the resistance at this point and thereby also reduce the heat generated.

And a sill further object is to produce an electrode holder of such construction that it can be completely insulated both electrically and against the conduction of heat.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 4 is a section taken on line 4—4, Figure 1;

Figure 5 is a view partly in section and partly in plan looking in the direction of arrows 5, Figure 4;

Figure 6 is a section taken on line 6—6, Figure 4;

Figure 7 is a transverse section taken on line 7—7, Figure 4; and

Figure 8 is a bottom plan view of the clamping nut, a portion thereof being broken away to better disclose the construction.

Figure 1:
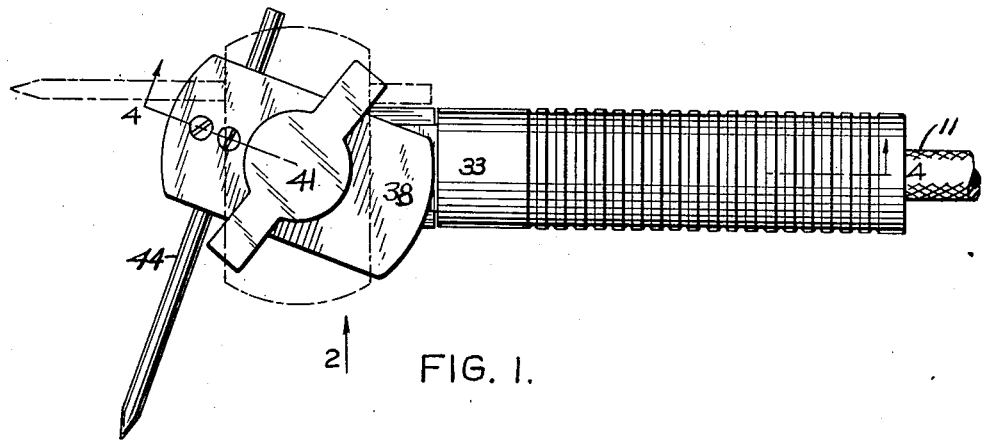
Figure 1 is a top plan view of the electrode holder looking in the direction of arrow 1, Figure 2.
Figure 2:
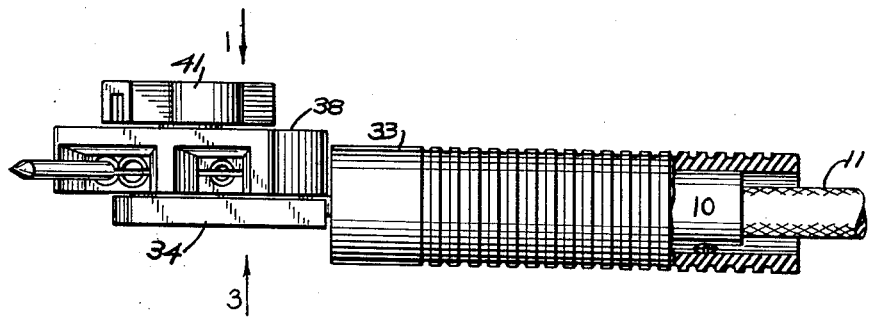
Figure 2 is a side elevation looking in the direction of arrow 2, Figure 1.
Figure 3:
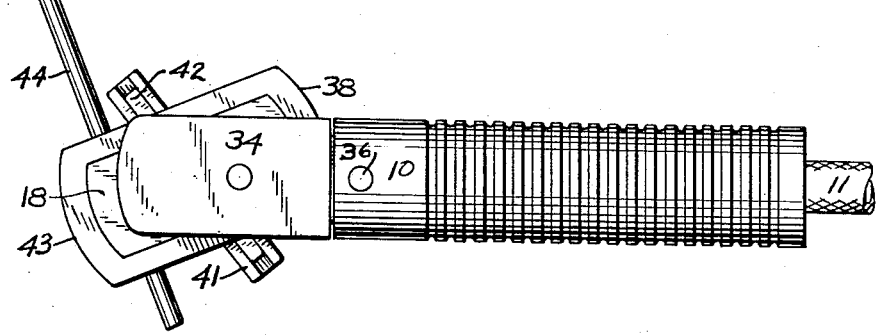
Figure 3 is a bottom plan view looking in the direction of arrow 3, Figure 2.

In the drawings reference numeral 10 designates the metal portion of the handle. This portion is tubular and serves to receive the end 11 of the conductor that carries the welding current. A plurality of screws 12 pass through threaded openings in the wall of the handle and serve to clamp the conductor in place in the manner shown quite clearly in Figure 4. The other end of the handle is provided with a flattened portion 13, whose upper surface has been designated by reference numeral 14 and will be referred to as a friction surface. A pivot bolt 15 extends through an opening in the flattened end 13 and projects perpendicularly from the friction surface. This bolt is threaded as indicated at 16.

The clamping head, which has been designated in its entirety by reference number 17, comprises a lower jaw 18 and an upper jaw 19. In the embodiment shown these jaws are integrally connected at 20, but it is to be understood that they may be connected by means of a hinge or that they may even be two entirely separate members. Jaw 18 is provided with an opening 21 for the reception of the corresponding portion of the pivot bolt and jaw 19 is provided with an opening 22, which is larger than opening 21. The clamping head is secured by means of a nut 23, and a lock nut 24. An ordinary washer 25 is positioned adjacent the upper surface of jaw 18 and separating this from the nut 23 is a spring washer 26. By adjusting the nuts 23 and 24, the clamping head is urged against the friction surface with sufficient force to produce a frictional resistance sufficient to hold the head against accidental rotation about the pivot bolt. The reason opening 22 is larger than opening 21 is apparent, because the nuts 23 and 24 are positioned therein. Pivot bolt 15 extends upwardly a considerable distance above the upper surface of jaw 19 and a clamping nut 27 is operatively connected with the upper end of the bolt. The clamping nut has a central recess 28 of substantially the same size as opening 22 and is provided about its outer surface with an annular groove 29. The lower wall of the groove forms a flange 30. Secured to the upper surface of jaw 19 is a short piece of metal 31 that projects into the groove 29 of the nut and holds the latter against upward movement relative to jaw 19. The adjacent surfaces of the jaws are provided with complementary depressions 32 of different sizes for the reception of the welding electrode.

It will be apparent from the above description that the clamping head is held against accidental rotation by means of the nuts 23 and 24 and at the same time the jaw 19 can be moved relative to jaw 18 for the purpose of releasing or clamping an electrode in position. By means of the nut 27, whose lower end engages the upper surface of jaw 19, the upper jaw can be forced downwardly against an electrode positioned in one of the openings 32. When nut 27 is rotated in a direction to move it upwardly on the pivot bolt, it engages the lower surface of the part 31 and raises jaw 19 upwardly. The purpose of this interlock between nut 27 and jaw 19, in addition to making it possible to separate the jaws in case they should be strained so as to acquire a permanent set, is to prevent the nut 27 from becoming accidentally separated from the tool and lost.

In the above description the metal parts only have been referred to, but it will be observed from the drawings that the several metallic parts are enclosed in insulating material. Handle 10 is enclosed in a tubular member 33 of fiber, hard rubber or any other suitable electrical insulating material. This insulating material usually also has the property of being a good heat insulator. The flattened end portion 13 is covered along its sides, bottoms and end by an insulating member 34. The insulating member 33 is held in place by means of one or more screws 35, whose heads are countersunk and covered with a plug 36 of insulating material and insulator 34 is similarly held in place by means of a screw 37. The clamping head is enclosed in a box-like insulator 38 that extends downwardly over the sides and ends. The sides of this insulator are provided with openings 39, through which the electrodes may be inserted into the depressions 32 in the clamping jaws. The insulator 38 is attached to the jaw 19 by one or more screws 40. Due to the box-like insulator 38, it is possible to employ jaws 18 and 19 that are entirely separated because they will be held in proper alignment by means of the enclosing insulator. Although two separate jaws may be employed, a construction like that shown in the drawings is recommended as preferable.

The nut 27 is enclosed in an insulator 41 which entirely covers the exposed outer surface and extends over the wings 42 so that the holder may be conveniently operated without the necessity of the operator coming in contact with any electrically charged surface.

Attention is called to the fact that the ends 43 of insulator 38 are arcuate, being curved about the center of the clamping bolt 15; this permits the clamping head to be rotated through an angle of 360 degrees and more particularly through an angle of 180 degrees so that the open end of the clamping head can be turned outwardly as shown in Figure 4 or rotated so as to bring the open end inwardly. This is of importance in employing a very small electrode and the end where it is clamped can thus be brought to the outside into the position shown in Figure 1.

In the drawings the friction surface 14 and the cooperating surface of the jaw 18 have been shown as plane surfaces but it is to be understood that frusto-conical or spherical surfaces can be employed wherever such a construction is believed to be preferable.

Referring now more particularly to Figure 1, it will be observed that the electrode 44 can be moved from the full line to the dotted line position. The full line position is suitable for use when making a horizontal weld as, for example, when the parts are supported on a table. When a vertical surface is to be welded, either along a horizontal or a vertical line, the electrode 44 is moved into the broken line position and projects practically parallel with the axis of the handle. It is evident, of course, that any other position that might be found desirable can be obtained by rotating the clamping head about the pivot bolt.

Attention is called in particular to the feature of the construction shown in Figure 4, in which the clamping head is held against the friction surface by means of the nuts and spring washer, whose adjustments remain constant, and to the fact that the upper jaw is moved independently by means of the nut 27. This construction assures that the clamping head will never become loose so as to shift its position in an accidental manner and it also assures that the two jaws will not become accidentally separated. The interconnection between nut 27 and jaw 19 makes it possible not only to move them towards each other, but also to spread them apart should occasion require. The latter is useful in cases where, due to some accidental pressure, the jaws have received a permanent set so as to prevent them from moving apart as far as desired due to their spring action and where the jaws are hingedly connected the interconnection between the nut and the upper jaw member is of considerable importance.

By positioning the nuts 23 and 24 in an opening in the upper jaw, a neat construction is obtained. It would, of course, be possible to position the nuts in an opening in insulating member 34 and to permanently attach the bolt to the wall of opening 21 but this is not considered to be a practical construction. It is to be understood, however, that applicant desires protection against obvious modifications by means of which the same results are obtained by substantially the same or equivalent means.

Wherever the terms upper and lower are employed in connection with the description, or in the claims, the relationship of parts shown in Figure 4 is referred to. Since the tool can be rotated about its axis these terms must, of course, be construed in relation to a certain position.

Having described the invention what is claimed as new is:

1. An electrode holder comprising a handle having one end provided with a friction surface, a clamping head rotatably connected with the handle by means of a pivot pin projecting from the friction surface, the clamping head comprising two jaws, means for holding the jaws in spaced relation, means for urging the surface of one jaw against the friction surface with sufficient force to resist accidental rotation, means for holding the jaws in alignment, and means for simultaneously urging one jaw towards the other jaw and towards the friction surface.

2. An electrode holder comprising a handle having one end provided with means for effecting a connection with an electric cable and the other with a friction surface, a bolt connected with the handle and projecting from the friction surface, a clamping head having two spaced jaws, one jaw having a surface resting on the friction surface, the jaws having aligned openings of different size, the opening in the jaw adjacent the friction surface being of a size to receive the bolt, the hole in the other jaw being of sufficient size to receive a nut, a nut operatively connected with the bolt, resilient means between the nut and the lower jaw, and a second nut operatively connected with the bolt for engagement with the upper surface of the upper jaw, the first mentioned nut serving to secure the clamping head to the handle and the second nut serving to urge the upper jaw towards the lower jaw and the clamping head against the friction surface.

3. A welding electrode holder comprising a handle having one end provided with a friction surface, a clamping head having two spaced jaws provided with complementary electrode engaging surfaces, means comprising a bolt for pivotally attaching the clamping head to the handle, means comprising a resilient member and the bolt for urging the clamping head against the friction surface to effect a frictional resistance against relative rotary movement about the pivot, the jaws having aligned openings concentric with the pivot, a bolt having its lower end in cooperative engagement with that portion of the handle having the friction surface and projecting through the openings in the jaws, and means comprising a nut operatively associated with the bolt and the upper jaw for urging it towards the lower jaw to clamp an electrode therebetween.

4. A welding electrode holder comprising a handle having one end provided with a friction surface, a bolt projecting upwardly from the friction surface, a clamping head having two vertically spaced jaws provided with complementary electrode engaging surfaces, the lower surface of the lower jaw being in contact with the friction surface, the jaws having axially aligned holes through both of which the bolt extends, the hole in the lower jaw being smaller than the hole in the upper jaw, a nut on the bolt in position to exert pressure on the lower jaw urging it against the friction surface, and another nut operatively connected with the bolt and positioned for engagement with the upper surface of the upper jaw to urge it towards the lower jaw to clamp an electrode between them.

5. A welding electrode holder comprising a handle having one end provided with a friction surface, a bolt projecting upwardly from the friction surface, a clamping head having two vertically spaced jaws provided with complementary electrode engaging surfaces, the lower jaw resting on the friction surface, the jaws having axially aligned holes through both of which the bolt extends, the hole in the jaw in contact with the friction surface being smaller than the hole in the other jaw, a nut operatively connected with the bolt and positioned to exert pressure on the lower jaw for urging it against the friction surface, a resilient element positioned between the nut and the upper surface of the lower jaw, and another nut operatively connected with the bolt and positioned for engagement with the upper surface of the upper jaw to urge it towards the lower jaw to clamp an electrode between them.

6. A welding electrode holder comprising a handle having one end provided with a friction surface, a bolt projecting upwardly from the friction surface, a clamping head having two vertically spaced jaws provided with complementary electrode engaging surfaces, the jaws having axially aligned holes through both of which the bolts extend, the lower jaw resting on the friction surface, the hole in the jaw in contact with the friction surface being smaller than the hole in the other jaw, a nut positioned on the bolt in position to exert pressure on the lower jaw urging it against the friction surface, another nut operatively connected with the bolt and positioned for engagement with the outer surface of the upper jaw to urge it towards the lower jaw to clamp an electrode between them, and means connected with the upper jaw and operatively engaging the last named nut to resist upward movement of the nut relative to the jaw whereby a force can be exerted thereon to move it away from the lower jaw.

7. An electrode holder comprising a handle having one end provided with a friction surface, a clamping head comprising two relatively movable jaws, one of which has one surface contacting the friction surface of the handle, means for holding the jaws in alignment, the two jaws having axially aligned openings, the handle having an opening, a bolt passing through all three openings, one end of the bolt being provided with threads, the bolt having an annular shoulder facing the handle, a spring surrounding the bolt with one end in operative engagement with the shoulder, the other end facing the friction surface, the spring and the bolt comprising means for urging one of the jaws against the friction surface of the handle, and means for moving the adjacent surfaces of the jaws towards each other to clamp an electrode therebetween, said means comprising a member in operative engagement with the theads on the bolt.

HARVEY H. HALL.